INVENTORS
PER BRO
ARABINDA NARAYAN DEY
BY
ATTORNEY

United States Patent Office 3,531,328
Patented Sept. 29, 1970

3,531,328
LIGHT METAL-COPPER CHLORIDE ORGANIC ELECTROLYTE CELL
Per Bro, Andover, and Arabinda N. Dey, Needham, Mass., assignors to P. R. Mallory & Co., Inc., Indianapolis, Ind., a corporation of Delaware
Filed Nov. 13, 1968, Ser. No. 775,487
Int. Cl. H01m 17/00
U.S. Cl. 136—100                                        14 Claims

ABSTRACT OF THE DISCLOSURE

A light metal anode-copper chloride cathode cell employing an organic electrolyte containing a metallic salt is provided with improved cell separator means. The halides of lead, mercury, iron, cobalt, nickel, silver, gold, cadmium and other halides of copper are also cathode materials. Ion exchange membranes exhibiting compatibility with organic solvents and having high exchange capacity and high electrical conductivity have been determined to be suitable for use as cell separators and to have such physical and electrostatic characteristics as to provide improved cell utilization efficiency and extended shelf life.

BACKGROUND OF THE INVENTION

Field of the invention

This invention pertains to high energy density cells employing light metal anodes and copper chloride cathodes in organic electrolytes, and more particularly to cells of this type incorporating ion exchange membranes as cell separators.

Description of the prior art

Studies of high energy density cells comprised of a lithium anode, a cathode, the active material of which is cupric chloride, an electrolyte composed of an organic solvent containing a metallic salt, and a glass filter paper separator interposed between the cell electrolyte and cathode as the cell barrier member, have indicated that relatively short shelf life is a severe shortcoming of cells of this construction. The cells were observed further to have such low utilization efficiency as to render the cell structure impractical for commercial usage.

Both of these cell shortcomings are primarily attributable to the solubility of the active cathode material in the organic electrolyte which results further in the formation of highly soluble chlorocuprate complexes. Diffusion of such complexes in the electrolyte and migration thereof promotes both rapid cathodic self-discharge and anodic passivation.

Where the active cathode material is cupric chloride, solubility thereof gives rise to the following formation of the highly soluble chlorocuprate complex $CuCl_3^-$:

$$CuCl_2 \rightleftharpoons Cu^{++} + 2Cl^-$$

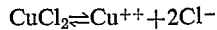

Similarly, where the cathode includes cuprous chloride as the active material, solubility thereof gives rise to the formation of the highly soluble chlorocuprate complex $CuCl_2^-$:

$$CuCl \rightleftharpoons Cu^+ + Cl^-$$

Diffusion of these ionic complexes in the cell electrolyte is not particularly detrimental to cell shelf life or utilization, if migration thereof from cathode to anode is prevented. The barrier member of these cells, however, being constituted by a glass filter paper separator, is ineffective to provide such control of the migration of the chlorocuprate complexes. This type of separator possesses only a characteristic microporosity and is thus adapted only to physically impede electrolyte flow such that free electrolyte flow is reduced to a negligible rate. Such limited electrolyte flow is of course essential to cell operation since the electrolyte must be ionically conductive. The requirement of ionic conductivity in the cell electrolyte is clearly inconsistent with the confinement of the chlorocuprate complexes where the cell is equipped with a barrier presenting a common physical impediment to the migration of all ions present in the cell.

SUMMARY OF THE INVENTION

The present invention provides improved shelf life and utilization efficiency in cells comprising a light metal anode, a cathode, the active material of which is cupric or cuprous chloride, and an electrolyte consisting of an organic solvent containing a metallic salt by introducing therein a cell barrier member or separator capable of selectively impeding the migration of certain ionic species present in the cell. In particular, barrier means providing both physical and selective electrostatic retardation of migration is incorporated in the cell in the form of an ion exchange membrane separator.

In the present invention it has been discovered that certain membranes, designed for commercial use in aqueous mediums for such purposes as water demineralization, dealkalization and softening, and comprised of synthetic organic resins containing cross-linked polyelectrolytes having large numbers of ion active groups attached thereto, are effective to provide the requisite physical impediment to migration and further are operative to substantially reduce if not totally inhibit the migration of soluble chlorocuprate complexes in light metal-copper chloride organic electrolyte cells.

In the present invention there has been determined further the feasibility of the use of membranes of cationic nature to retard the migration of soluble chlorocuprate complexes and the use of membranes of anionic nature to retard the migration of positively charged soluble ions present in light metal-copper chloride organic electrolyte cells.

It is a primary object of the present invention to provide a light metal-copper chloride organic electrolyte cell having improved shelf life and utilization efficiency.

It is a further object of this invention to provide a light metal-copper chloride organic electrolyte cell incorporating means for physically and electrostatically retarding the migration of soluble ionic active materials.

It is an additional object of the invention to provide a high energy density cell comprising a light metal anode, a cathode the actival material of which is cupric or cuprous chloride, an organic electrolyte and an ion exchange membrane cell separator.

The foregoing and other objects and features of the invention will be evident from the following detailed description of the invention and the accompanying drawings.

DESCRIPTION OF A PREFERRED EMBODIMENT

Figure 1:
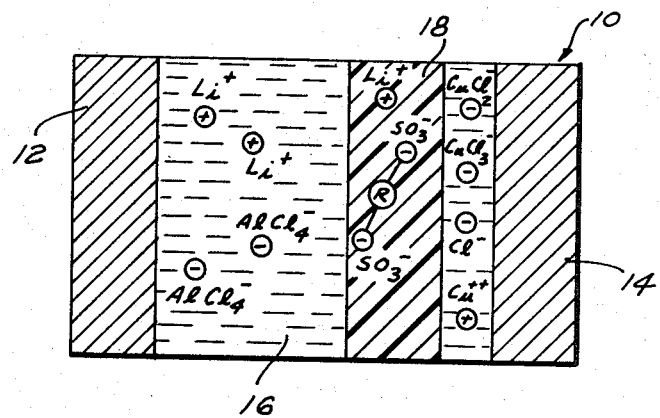
FIG. 1 is a schematic drawing of a cell arranged in accordance with the invention illustrating the cell barrier structure and ionic species present in the cell.

In the schematic drawing of FIG. 1, there is set forth a cell 10 comprised of a lithium anode 12 and a cupric chloride cathode 14 immersed in an organic electrolyte 16. Also disposed in contact with the electrolyte is a barrier element 18 so arranged in the cell as to separate the anode and cathode members. In the construction of a practical cell, barrier 18 is placed upon cathode 14 and there is disposed between anode 12 and barrier 18 an absorbent element which is saturated with the electrolyte. The absorbent is placed in direct contact with its interfaced cell components such that the contained electrolyte is in electrical contact with the anode and the barrier. Electrolyte contact with the cathode is restricted by the microporosity of barrier 18 to an extent that free flow of electrolyte therethrough is reduced to a negligible rate. During the shelf life of the practical cell and in operation thereof, however, both electrodes of the cell are effectively immersed in the electrolyte in the manner generally indicated in FIG. 1.

Electrolyte 16 of the cell of FIG. 1 is comprised of an organic solvent containing a metallic salt. The organic solvent may comprise propylene carbonate, dimethylformamide, gamma-butyrolactone, dimethyl sulfoxide, dimethylcarbonate, acetonitrile tetrahydrofuran and the solvent mixtures thereof. Suitable salts include those of sodium, potassium, magnesium, calcium, aluminum, lithium and beryllium. The anion of the electrolyte salt may be perchlorate, tetrachloroaluminate, hexafluorophosphate, tetrafluoroborate, hexafluoroarsenate, hexafluoroantimonate, or chloride.

In addition to lithium, light metal anode 12 may be formed of sodium, potassium, magnesium, calcium, aluminum, and beryllium. While $CuCl_2$ and $CuCl$ are the preferred active cathode materials of the invention, other suitable active cathode materials include the halides of lead, mercury, iron, cobalt, nickel, silver, gold, cadmium and other halides of copper.

For purposes of explanation of the characteristics and function of barrier 18, the cell of FIG. 1 will be discussed as having anode and active cathode materials of lithium and cupric chloride, respectively, and an electrolyte comprises of lithium tetrachloroaluminate, $LiAlCl_4$, in propylene carbonate solvent. The ionic constituency of the electrolyte upon assumbly of the cell, as illustrated schematically in FIG. 1, may be seen to include lithium and copper cations, and anions of tetrachloroaluminate, chloride, and the chlorocuprate complex.

In operation of the cell, it is of course essential that ionic conductivity be maintained in the electrolyte by the migration of cations to cathode 14 from anode 12. It is further essential that free electrolyte flow be reduced to a negligible rate. These considerations demand that barrier 18 have at least the characteristic of microporosity, i.e. that the barrier provide a common physical impediment to ion transport.

Barriers having only this characteristic, such as the above discussed cells having glass filter paper separators, do not particularly discriminate against migration of any ionic species in the electrolyte. Thus, the cathodic mass comprised of the cupric chloride electrode and the chlorocuprate complex, $CuCl_3^-$, undergoes extensive self-discharge with the chlorocuprate anions becoming distributed throughout the electrolyte rather than being confined to the cathode side of the barrier. Attending such migration of the chlorocuprate anions is a further cell reaction in which the lithium anode becomes passivated over an extended period of time.

In contrast to barriers providing only a characteristic microporosity, barrier 18 of cell 10 includes the further property of permselectivity, i.e. the barrier permits passage of some ionic species and not others.

It has been found that a barrier having suitable microporosity and permselectivity for use in a light metal-cupric chloride organic electrolyte cell may consist of commercially available ion exchange membranes heretofore in widespread use for dimineralization, dealkalization and softening of water and like purposes in connection with aqueous mediums. Such membranes are synthetic organic resins comprising cross-linked polyelectrolytes having a large number of ion active groups attached thereto. In general these membranes comprise a cross-linked polystyrene polymer which is sulfonated or carboxylated to develop the cationic exchange membrane or which is aminated to develop the anionic exchange membrane. Barrier 18 of FIG. 1 is illustrated as a cationic membrane comprised of rigid molecules R of the insoluble polymer each having a functional sulfonate group $SO_3^-$ attached thereto, the membrane incorporating further a required lithium counter cation, $Li^+$. The lithium counter cation in contrast to the rigid molecule and attached functional group, is bound loosely in the membrane and is capable of ready movement from the membrane into an associated solution. One characteristic for membrane selection is that the concentration of counter cations in the membrane be considerably greater than the concentration of cations in the cell electrolyte. Thus, in the cell of FIG. 1, barrier 18 preferably has a concentration of lithium ions of approximately ten times the concentration of lithium ions in the lithium tetrachloroaluminate propylene carbonate cell electrolyte.

As a result of these relative concentrations, and the loose containment of the counter cations in the membrane, upon assembly of the cell the lithium counter cations contained in barrier 18 tend to egress from the membrane into the electrolyte. As a result, the membrane acquires a net negative charge and there is established the Donnan potential difference between the membrane and the elctrolyte, a prime prerequisite for permselectivity. The membrane is thereby rendered effective to electrostatically repel migrating chlorocuprate complexes which also bear a negative charge.

Barrier 18 is a cation permeable electronegative membrane and has no electrostatic effect on the lithium ions in the electrolyte or other cations in the cell. Thus, cell cations encounter no other difficulty in migration to cathode 14 other than that posed by the microporous character of barrier 18. In this connection, it has been clearly established by both shelf life testing and utilization testing that the cationic membrane is effective to reduce if not totally inhibit migration of the chlorocuprate anions from cathode to anode and that the membrane is not effective in inhibiting the migration of cell cations to the extent that cell performance is degraded during its extended operating life when compared with the performance of the glass filter paper equipped cells during their brief operating life.

Shelf life testing

Two practical cells were constructed, each including a cupric chloride cathode, a lithium anode and lithium tetrachloroaluminate in propylene carbonate as the electrolyte. The cathodes were prepared by pasting a mixture of $CuCl_2$ and acetylene black, four parts to one part, on graphite cloth using ethyl cellulose in xylene as a binder. In one cell a glass filter paper separator was employed as the barrier member. In the other cell a cation exchange membrane available commercially as RAI P300 40/20, a product of the RAI Research Corporation, was employed as the barrier member. The two cells were maintained in a shelved condition (open circuit). After a period of 41 hours, the cell employing the glass filter paper was found to be completely discharged. In contrast, the cell employing the ion exchange membrane was found to have approximately 60% capacity left after 450 hours of standing.

Since the cells were not loaded in these tests, the loss of cell capacity is directly attributable to cathodic self-discharge. As discussed above, self-discharge of the light metal-cupric chloride organic electrolyte cell results largely from migration of the soluble chlorocuprate complexes. It is evident from the open circuit testing that the inclusion of an ion exchange membrane as the cell barrier is effective to reduce if not totally inhibit migration of the chlorocuprate complexes. It is concluded from this testing that the ion exchange membrane separator is effective to confine the soluble chlorocuprate complex to the vicinity of the cupric chloride cathode, or at least to the cathode side of barrier. The cell is thus provided with a long term cathodic mass comprised of the undissolved electrode proper and its confined soluble discharge products.

Utilization testing

Two other practical cells were constructed, each including a cupric chloride cathode, a lithium anode, and a lithium perchlorate propylene carbonate electrolyte. The cathodes were prepared as in the above-described cells with conductive particulate material admixed with the cupric chloride active cathode material. In the first cell (A) the cell barrier was comprised of two layers of glass filter paper separator. In the other cell, the barrier member was comprised of two layers of filter paper and one layer of the RAI P300 40/20 cationic exchange membrane. The cells were subjected to loading with current density set at 0.5 ma./cm.$^2$.

Figure 2:
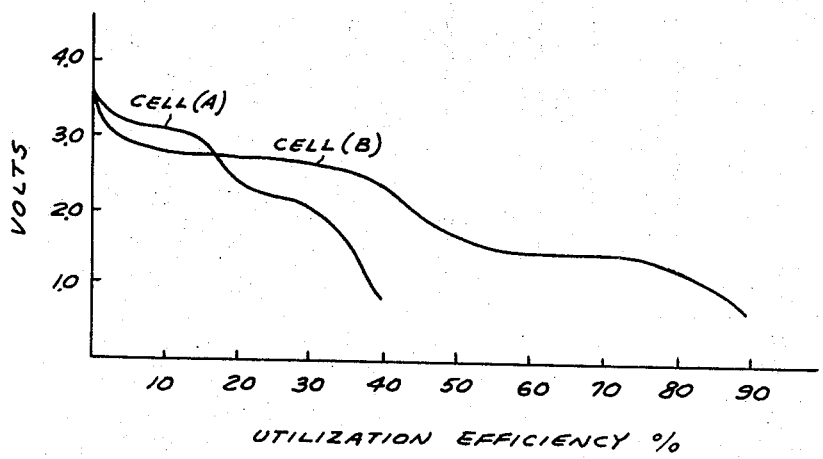
FIG. 2 is a graphic display of the operating characteristics of cells constructed in accordance with the invention in comparison with those of a like cell employing only a glass filter paper separator as the cell barrier member.

The discharge characteristics of the two cells are indicated in FIG. 2. It will be seen from the discharge curve for cell (A) that the cell exhibited an open circuit voltage of about 3.5 volts and provided a voltage under load of between 2.0 to 3.2 volts over its operating life. Utilization efficiency was determined to be approximately 40%. Referring to the discharge curve for cell (B), it will be seen that the cell exhibited an open circuit voltage of about 3.5 volts and provided a voltage under load of between 2.0 and 2.8 volts over its operating life. Utilization efficiency was determined to be approximately 85%.

The slight decrease in operating voltage of cell (B) is attributable to the increased internal resistance of the cell due to the presence of the ion exchange membrane. However, it will be apparent that a significant extension of operating life is gained thereby. This utilization testing establishes further, particularly when taken in conjunction with the shelf life testing above, that the presence of the ion exchange membrane in the cell, while effective to inhibit migration of the chlorocuprate complex, does not inhibit migration of the lithium cation necessary for cell operation.

It will be evident that the nature of the ion exchange membrane, i.e. cationic or anionic, employed in the light metal-metal halide organic electrolyte cell will depend upon the nature of the ionic species whose migration is desired to be inhibited. While the discussion has centered upon the soluble chlorocuprate complexes and their retention in the vicinity of the cell cathode, it is within the contemplation of the invention to employ an anionic exchange membrane as a cell separator where the constituency of the cell gives rise to the presence in the cell of a caation whose migration is detrimental to cell shelf life and utilization. Similarly, it is within the contemplation of the invention to employ as a cell barrier member a bipolar or amphoteric ion exchange membrane, i.e. a membrane having anionic and cationic components.

The above-discussed requirement that the ion exchange membrane contain a relatively high concentration of counter cations compared to the concentration of cations in the electrolyte, is generally indicated by the exchange capacity of the membrane which is defined as the number of equivalents of fixed ionic groups in the resin per unit weight (dry) of the resin. For commercially available ion exchange membranes, the exchange capacity is normally determined in an aqueous medium for which application the membrane is designed. Thus, in the present use of such membranes, in a non-aqueous medium, it should be noted that membrane exchange capacity is generally reduced from that specified by the manufacturer. Reduction of exchange capacity in the order of 40% may be expected in organic electrolytes.

A further consideration in the selection of a barrier member from the commercially available ion exchange membranes is the compatibility of the membrane with the electrolyte solvent. In this regard membrane suitability may be determined by placing the selected membrane in the organic solvent and observing the effect of the solvent thereon. Solubility of the membrane resin or its backing member in the solvent renders the membrane unsuitable for use.

One further characteristic of importance in the selection of membranes for use in the present invention is membrane conductivity. In this connection, it should be noted that the low conductivity (high resistivity) membranes produce undesirably high cell IR drops. Thus, higher conductivity membranes are preferably employed. It should be noted also that membrane conductivity may be improved by increasing its exchange capacity. Thus, increasing the lithium ion concentration in a membrane will render useful an otherwise unsuitable membrane.

While the invention has been described in connection with several particular cell structures, these are intended in a descriptive and not a limiting sense. Such changes and modifications as will be evident to those having ordinary skill in the art to which the invention applies are within the contemplation of the invention.

What is claimed is:

1. A high energy density cell comprising a light metal anode, a cathode the active material of which is a halide of a metal selected from the group consisting of copper, lead, mercury, iron, cobalt, nickel, silver, gold, cadmium, an electrolyte of a liquid organic solvent containing a metal salt and microporous permselective polymeric membrane barrier means separating said cathode and said electrolyte.

2. The cell claimed in claim 1 wherein said barrier means comprises an ion exchange membrane of crosslinked polystyrene polymer.

3. The cell claimed in claim 2 wherein said ion exchange membrane is cationic.

4. The cell claimed in claim 2 wherein said electrolyte comprises an organic solvent selected from the group consisting of propylene carbonate, dimethylformamide, gamma-butyrolactone, dimethylsulfoxide, dimethylcarbonate, acetonitrile tetrahydrofuran, said solvent containing a metallic salt.

5. The cell claimed in claim 4 wherein said metallic salt is a salt of at least one metal selected from the group consisting of lithium, sodium, potassium, magnesium, calcium, aluminum and beryllium.

6. The cell claimed in claim 5 wherein said salt includes an anion selected from the group consisting of perchlorate, tetrachloroaluminate, hexafluro phosphate, tetrafluoroborate, hexafluoroarsenate, hexafluoroantimonate and chloride.

7. The cell claimed in claim 1 wherein said barrier means comprises a combined filter paper separator and an ion selective membrane in juxtaposition.

8. The cell claimed in claim 1 wherein said active cathode material is a chloride of copper.

9. The cell claimed in claim 8 wherein said cathode includes a particulate material of higher electrical conductivity than said chloride of copper.

10. The cell claimed in claim 8 wherein said anode comprises lithium.

11. The cell claimed in claim 10 wherein said electrolyte comprises propylene carbonate containing lithium-tetrachloroaluminate.

12. The cell claimed in claim 10 wherein said electrolyte comprises propylene carbonate containing lithium perchlorate.

13. The cell claimed in claim 8 wherein said anode comprises of magnesium.

14. The cell claimed in claim 8 wherein said anode comprises of aluminum.

References Cited

UNITED STATES PATENTS

| | | | |
|---|---|---|---|
| 2,861,116 | 11/1958 | Grubb | 136—153 |
| 2,913,511 | 11/1959 | Grubb. | |
| 3,043,896 | 7/1962 | Herbert et al. | 136—6 |
| 3,185,590 | 5/1965 | Mayer et al. | 136—6 |
| 3,279,952 | 10/1966 | Minnick | 136—83 |
| 3,324,068 | 6/1967 | Michaels | 136—146 |
| 3,376,168 | 4/1968 | Horowitz | 136—146 |
| 3,393,092 | 7/1968 | Shaw et al. | 136—6 |
| 3,393,093 | 7/1968 | Shaw et al. | 136—6 |
| 3,415,687 | 12/1968 | Methlie | 136—83 |

WINSTON A. DOUGLAS, Primary Examiner

C. F. LEFEVOUR, Assistant Examiner

U.S. Cl. X.R.

136—120, 146, 155